(12) United States Patent
Chujoh et al.

(10) Patent No.: US 7,292,633 B2
(45) Date of Patent: *Nov. 6, 2007

(54) METHOD FOR DETECTING A MOVING OBJECT IN MOTION VIDEO AND APPARATUS THEREFOR

(75) Inventors: Takeshi Chujoh, Tokyo (JP); Yoshihiro Kikuchi, Yokohama (JP); Akira Sakuma, Yokohama (JP); Toshifumi Hayashi, Yokohama (JP); Hiroyuki Kobayashi, Tokyo (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 378 days.

This patent is subject to a terminal disclaimer.

(21) Appl. No.: 10/937,774

(22) Filed: Sep. 10, 2004

(65) Prior Publication Data

US 2005/0031040 A1    Feb. 10, 2005

Related U.S. Application Data

(63) Continuation of application No. 09/654,871, filed on Sep. 1, 2000, now Pat. No. 6,876,701.

(30) Foreign Application Priority Data

Sep. 2, 1999   (JP)   ................................ 11-248851

(51) Int. Cl.
    *H04N 7/12*   (2006.01)
(52) U.S. Cl. .............. 375/240.08; 375/240.13
(58) Field of Classification Search ................
              375/240.01–240.06, 240.12–240.16, 240.26,
                                                    375/240.08
    See application file for complete search history.

(56) References Cited

U.S. PATENT DOCUMENTS 5,625,715 A    4/1997  Trew et al.
5,729,295 A *  3/1998  Okada .................... 375/240.13
5,886,743 A *  3/1999  Oh et al. ................ 375/240.02
5,926,212 A *  7/1999  Kondo .................... 348/207.99
6,025,879 A *  2/2000  Yoneyama et al. ..... 375/240.24
6,160,848 A * 12/2000  Sivan .................... 375/240.13
6,208,693 B1 * 3/2001  Chen et al. ............ 375/240.24

(Continued)

FOREIGN PATENT DOCUMENTS

JP       9-252467      9/1997
JP       10-75457      3/1998

*Primary Examiner*—Mehrdad Dastouri
*Assistant Examiner*—Dave Czekaj
(74) *Attorney, Agent, or Firm*—Oblon, Spivak, McClelland, Maier & Neustadt, P.C.

(57) ABSTRACT

An apparatus for detecting a moving object in motion video comprises a macro-block determining section for determining the background/non-background of each macro-block of a reconstructed video signal from a video decoder section which decodes encoded data obtained by compression-encoding a motion video signal, a moving object determining section for determining an area of the moving object from the result of the determination on the background/non-background, and a moving object combination display for displaying information indicating the area of the moving object on a display screen for the reconstructed video signal. The macro-block determining section determines if a macro-block represents a background area or a non-background area, based on mode information from the video decoder section and a cross correlation value between a present frame of the reconstructed video signal and a signal of a frame preceding the present frame by one frame, obtained by a first cross correlation calculator, and a cross correlation value between the present frame of the reconstructed video signal and a background video signal stored in a background memory, obtained by a second cross correlation calculator.

1 Claim, 9 Drawing Sheets

U.S. PATENT DOCUMENTS

| | | |
|---|---|---|
| 6,249,613 B1 * | 6/2001 | Crinon et al. ............... 382/236 |
| 6,301,370 B1 | 10/2001 | Steffens et al. |
| 6,392,694 B1 | 5/2002 | Bianchi |
| 6,545,706 B1 | 4/2003 | Edwards et al. |
| 6,618,439 B1 * | 9/2003 | Kuo et al. ............. 375/240.16 |

* cited by examiner

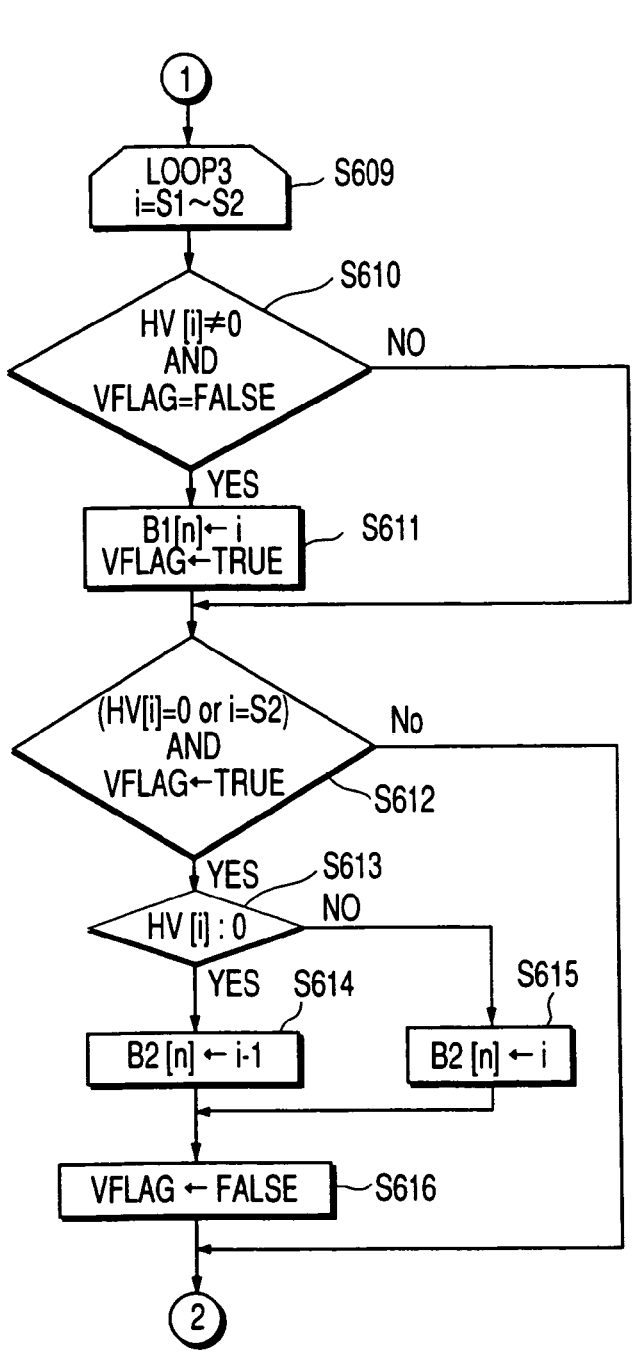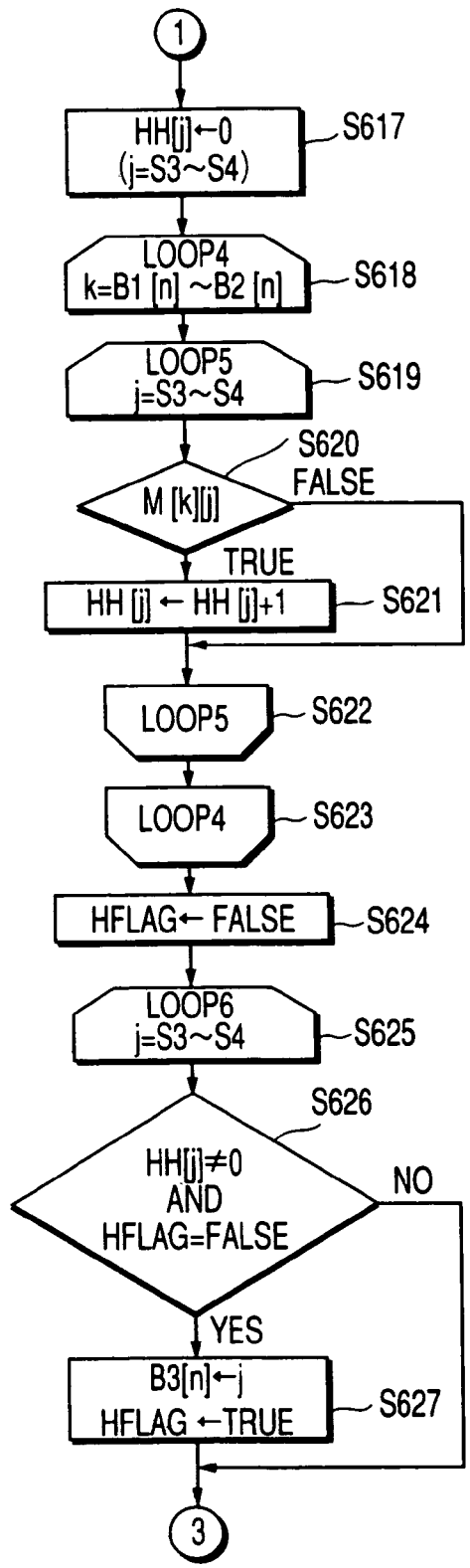
FIG. 9
FIG. 10

METHOD FOR DETECTING A MOVING OBJECT IN MOTION VIDEO AND APPARATUS THEREFOR

CROSS-REFERENCE TO RELATED APPLICATIONS

This application is based upon and claims the benefit of priority under 35 U.S.C. § 120 for U.S. application Ser. No. 09/654,871 filed Sep. 1, 2000 now U.S. Pat. No. 6,876,701, and under 35 U.S.C. § 119 from the prior Japanese Patent Application No. 11-248851, filed on Sep. 2, 1999, the entire contents of each which both are incorporated herein by reference.

BACKGROUND OF THE INVENTION

The present invention relates to a method for detecting a moving object in motion video and an apparatus therefor, and, more particularly, to a method for detecting a moving object in motion video from the output of a video decoder and an apparatus therefor.

To detect a moving object present in motion video, it is generally necessary to check the motion of each pixel image. But, the pixel-by-pixel motion checking actually requires a vast amount of computation. In the case of the CIF format that is often used in H. 261 or H. 263 in ITU-T which is the international standard for video compression, MPEG-4 or the like of ISO/IEC, for example, it is necessary to detect the motion of each of a huge number of pixel images amounting to 101,376 pixels consisting of 352 pixels horizontal by 288 pixels vertical. Such a process that demands a vast amount of computation needs special hardware, which leads to an increased cost.

Jpn. Pat. Appln. KOKAI Publication No. 252467/1997 proposes a moving object detecting apparatus which employs a scheme of detecting a moving object from the motion vector that is generated by a video encoder. As this scheme can use a motion vector for each block generated by the video encoder in detecting a moving object, it need not to particularly check the motion of each pixel in order to detect a moving object. This scheme can significantly reduce the amount of computation needed to detect a moving object.

However, a block which shows a large motion vector or a rewritten block should not necessarily be a moving object. Further, a block which has not been rewritten may be present even in a block in a moving object. In consideration of adapting the moving object detecting method, which uses the aforementioned motion vector, to monitoring a moving object, this method may not be able to acquire needed videos.

As apparent from the above, the prior art requires a vast amount of computation to detect a moving object so that the conventional method that uses encoded video data does not provide a sufficient precision.

BRIEF SUMMARY OF THE INVENTION

Accordingly, it is an object of the present invention to provide a video moving object detecting apparatus capable of detecting a moving object fast, stably and accurately.

According to a first aspect of this invention, there is provided a video moving object detecting method comprising the steps of determining if a video signal in a given unit area (e.g., a macro-block) represents a background area or a non-background area from a reconstructed video signal acquired by decoding encoded data obtained by compression-encoding a motion video signal; and determining an area of a moving object from a result of the determination on whether the video signal represents the background area or the non-background area. This method further includes a step of displaying information indicating the area of the determined moving object on a display screen for the reconstructed video signal.

According to a second aspect of this invention, there is provided a video moving object detecting apparatus comprising a background/non-background determining section for determining if a video signal in a predetermined unit area of a reconstructed video signal acquired by a video decoder section for decoding encoded data obtained by compression-encoding a motion video signal represents a background area or a non-background area; and a moving object determining section which determines an area of a moving object from a result of the determination done by the background/non-background determining section for each unit area. The video moving object detecting apparatus further comprises a display section which displays information indicating the area of the moving object, determined by the moving object determining section, on a display screen for the reconstructed video signal.

More specifically, the video moving object detecting apparatus according to this invention further comprises a first cross correlation computation section which computes a cross correlation value between a present frame of the reconstructed video signal and a signal of a frame preceding the present frame by one frame, unit area by unit area; a storage section for storing a background video signal indicative of a background portion of the reconstructed video signal; and a second cross correlation computation section which computes a cross correlation value between the present frame of the reconstructed video signal and the background video signal stored in the storage section, unit area by unit area, wherein based on mode information indicating an encoding mode acquired from the video decoder section and the cross correlation values acquired by the first and second cross correlation computation sections, the background/non-background determining section determines if the video signal in the predetermined unit area represents a background area or a non-background area.

The video moving object detecting apparatus further comprises an update section which, when the background/non-background determining section determines that the video signal in the predetermined unit area of the reconstructed video signal represents a background area, updates the background video signal stored in the storage section with the video signal in the unit area which has been determined as representing the background area.

The moving object determining section determines, as the area of the moving object, an area where, for example, a plurality of unit areas which have been determined as representing a non-background area by the background/non-background determining section are located adjacent to one another.

In short, because this invention can further determine what lies inside a moving object or the background hid behind the moving object by combining the video decoding scheme with detection of a moving object, the invention can detect a moving object in motion video fast with a smaller amount of computation, stably and accurately.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a flowchart schematically showing the moving object enclosing process which is performed in the moving object determining section in this embodiment;

FIG. 10 is a flowchart schematically showing the moving object enclosing process which is performed in the moving object determining section in this embodiment;

DETAILED DESCRIPTION OF THE INVENTION

A preferred embodiment of the present invention will now be described with reference to the accompanying drawings.

Figure 1:
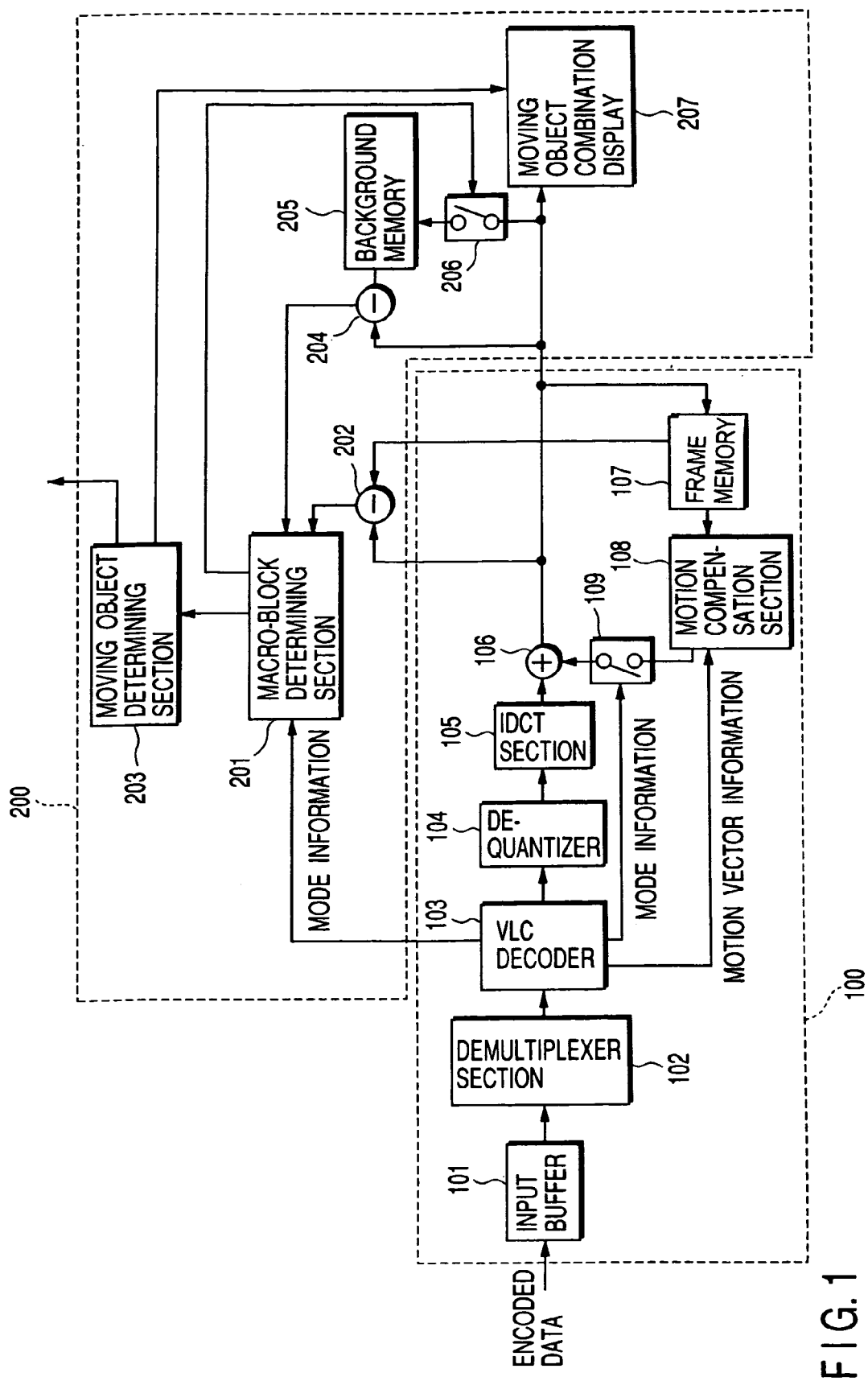
FIG. 1 is a block diagram illustrating the structure of a video moving object detecting apparatus according to one embodiment of this invention.

FIG. 1 is a block diagram illustrating the structure of a video moving object detecting apparatus according to one embodiment of this invention. This video moving object detecting apparatus comprises a video decoder section 100 and a moving object detector section 200, which will be discussed below in order. The following description is given of the case where this invention is adapted to a video moving object detecting apparatus based on the MPEG system and a unit area of a reconstructed video signal is equivalent to a macro-block in the MPEG system.

Video Decoder Section 100

The video decoder section 100 is a video decoder based on, for example, the MPEG system, or a so-called MPEG decoder. Encoded data which is obtained by compression-encoding in a video encoder (not shown), such as an MPEG encoder, is input to the video decoder section 100 over a transmission channel or via a storage system.

The input encoded data is temporarily stored in an input buffer 101. The encoded data read out from the input buffer 101 is demultiplexed frame by frame based on a syntax by a demultiplexer section 102, and is then input to a variable length codes decoder 103. The variable length codes decoder 103 decodes individual syntax information, such as quantized DCT coefficient information, mode information and motion vector information, which have undergone variable-length encoding, macro-block by macro-block. In the following description, a macro-block or a unit area which is to be processed is called "interest macro-block".

The mode for the interest macro-block in the variable length codes decoder 103 is an INTRA (intra-frame encoding) mode, a mode switch 109 is set off in accordance with mode information output from the variable length codes decoder 103. In this case, the quantized DCT coefficient information decoded by the variable length codes decoder 103 is dequantized by a dequantizer 104 and is then subjected to inverse discrete cosine transform (IDCT) in an IDCT section 105, thus yielding a reconstructed video signal. This reconstructed video signal is stored as a reference picture signal in a frame memory 107 and is input to a moving object combination display 207 in the moving object detector section 200 both via an adder 106.

When the mode for the interest macro-block is an INTER (inter-frame encoding) mode and NOT_CODED (not-encoded block) mode, the mode switch 109 is set on in accordance with mode information output from the variable length codes decoder 103. In this case, the quantized DCT coefficient information for a predictive error signal, decoded by the variable length codes decoder 103, is dequantized by the dequantizer 104 and is then subjected to inverse discrete cosine transform in the IDCT section 105, thus yielding a predictive error signal.

Based on motion vector information decoded in the variable length codes decoder 103, a motion compensation section 108 performs motion compensation on the reference picture signal from the frame memory 107. The compensated reference picture signal and the predictive error signal from the IDCT section 105 are added by the adder 106, thus producing a reconstructed video signal. This reconstructed video signal is stored as the reference picture signal in the frame memory 107 and is input to the moving object combination display 207 in the moving object detector section 200.

Moving Object Detector Section 200

The moving object detector section 200 comprises a macro-block determining section 201, a first cross correlation calculator 202, a first cross correlation calculator 202, a moving object determining section 203, a second cross correlation calculator 204, a background memory 205, an update switch 206 and the moving object combination display 207.

The macro-block determining section 201, the moving object determining section 203 and the moving object combination display 207 in the moving object detector section 200 respectively execute three processes, namely, a macro-block determining process (step S101) of determining whether an interest macro-block is a background macro-block or a non-background macro-block frame by frame, a moving object determining process (step S102) of determining a moving object based on the result of the macro-block determining process and a moving object combination display process (step S103) of combining the determined moving object with the decoded reconstructed video signal and displaying the result.

The macro-block determining section 201 determines whether a video signal represents a background area or a non-background area, macro-block by macro-block in a frame, based on a cross correlation value between the reconstructed video signal output from the adder 106 and the reference picture signal of one preceding frame held in the frame memory 107, which is acquired by the first cross correlation calculator 202, and a cross correlation value between the reconstructed video signal output from the adder 106 and a background video signal held in the background memory 205, which is acquired by the second cross correlation calculator 204.

The background video signal held in the background memory 205 is updated with the reconstructed video signal via the background-memory update switch 206 which is set on or off in accordance with the result of the decision made by the macro-block determining section 201.

Macro-block Determining Process S101

Specific procedures of the macro-block determining process S101 in FIG. 2 will be described below with reference to the flowchart illustrated in FIG. 3. In FIG. 3, "i" and "j" respectively represent the vertical and horizontal macro-block addresses, and V_NMB and H_NMB respectively represents the numbers of vertical and horizontal macro-blocks in a frame. M[i][j] is a two-dimensional array which stores information about whether each macro-block is a background macro-block or a non-background macro-block, TRUE indicating a non-background macro-block while FALSE indicates a background macro-block.

First, the macro-block determining section 201 sets the initial value of the two-dimensional array M[i][j] to FALSE (step S200). Next, the macro-block determining section 201 determines mode information MODE from the variable length codes decoder 103 macro-block by macro-block (step S203).

If the result of the decision in step S203 shows that the mode information MODE of the interest macro-block is CODED (encoded block), the macro-block determining section 201 computes a cross correlation value between the reconstructed video signal of the encoded macro-block acquired via the adder 106 and the reference picture signal of one preceding frame held in the frame memory 107, and the macro-block determining section 201 compares this cross correlation value with a threshold value TH1 (step S204).

If the cross correlation value computed by the first cross correlation calculator 202 is greater than the threshold value TH1, the macro-block determining section 201 determines that the interest macro-block is a non-background macro-block and sets the two-dimensional array M[i][j] to TRUE (step S208). If the cross correlation value computed by the first cross correlation calculator 202 is equal to or smaller than the threshold value TH1, the flow goes to step S206 to further determine whether the interest macro-block is a background macro-block or a non-background macro-block.

If the result of the decision in step S203 shows that the mode information MODE of the interest macro-block is NOT_CODED (encoding unnecessary), on the other hand, the macro-block determining section 201 then determines whether the result of the decision on the macro-block of one preceding frame at the same position as the interest macro-block is a background macro-block, i.e., if the two-dimensional array M[i][j] is FALSE (step S205). If the result of the decision in this step S205 shows that the macro-block of one preceding frame at the same position as the interest macro-block is a background macro-block, the macro-block determining section 201 determines the interest macro-block as a background macro-block and sets the two-dimensional array M[i][j] to FALSE (step S209).

If the result of the decision in this step S205 shows that the macro-block of one preceding frame at the same position as the interest macro-block is not a background macro-block, on the other hand, it is then checked if a background video signal corresponding to the position of the interest macro-block is located in the background memory 205 (step S206).

If the background video signal corresponding to the position of the interest macro-block is not located in the background memory 205, the macro-block determining section 201 determines the interest macro-block as a new background macro-block and proceeds to step S209. If the background video signal corresponding to the position of the interest macro-block is located in the background memory 205, however, the second cross correlation calculator 204 calculates a cross correlation value between the video signal of the interest macro-block and the background video signal at the position corresponding to the interest macro-block in the background memory 205, and the macro-block determining section 201 compares this cross correlation value with a threshold value TH2 (step S207).

If the cross correlation value computed by the second cross correlation calculator 204 is greater than the threshold value TH2, the macro-block determining section 201 determines that the interest macro-block is a non-background macro-block and sets the two-dimensional array M[i][j] to TRUE (step S208). If this cross correlation value is not more than the threshold value TH2, the interest macro-block is determined as a background macro-block and the flow goes to step S209. With regard to the interest macro-block that has been determined as a background macro-block, the background video signal at the position corresponding to the interest macro-block in the background memory 205 is updated (step S210).

According to this embodiment, normalized cross correlation values are computed by the first and second cross correlation calculators 202 and 204 as one example. The normalized cross correlation values are acquired by the following equation.

$$C = \frac{1}{N} \sum_{i=0}^{15} \sum_{j=0}^{15} \left( \frac{F_c(i,j) - \mu_c}{\sigma_c} - \frac{F_r(i,j) - \mu_r}{\sigma_c} \right)^2$$

where $F_c(i, j)$ is the luminance of each pixel of the reconstructed video signal of the interest macro-block and $F_r(i, j)$ is the luminance of each pixel of a macro-block at the same position as the frame that is to undergo cross correlation computation. $\mu_c$, $\mu_r$, $\sigma_c$, $\sigma_r$ are the averages of the luminance of each pixel and the standard deviations in the respective macro-blocks.

In computing a cross correlation value between the reconstructed video signal output from the adder 106 in the first cross correlation calculator 202 and the reference picture signal of one preceding frame held in the frame memory 107, this cross correlation value may be computed directly but may be acquired by computing the absolute sum Σ|MV| of the motion vector of the interest macro-block and the absolute sum Σ|COF| of the DCT coefficient from the motion vector information and DCT coefficient information from the variable length codes decoder 103 and then comparing the absolute sums with respective threshold values. In this case, when the absolute sum Σ|MV| of the motion vector and the absolute sum Σ|COF| of the DCT coefficient are greater than their threshold values, the interest macro-block is determined as a non-background macro-block.

Background Memory Update Step S210

Figure 4:
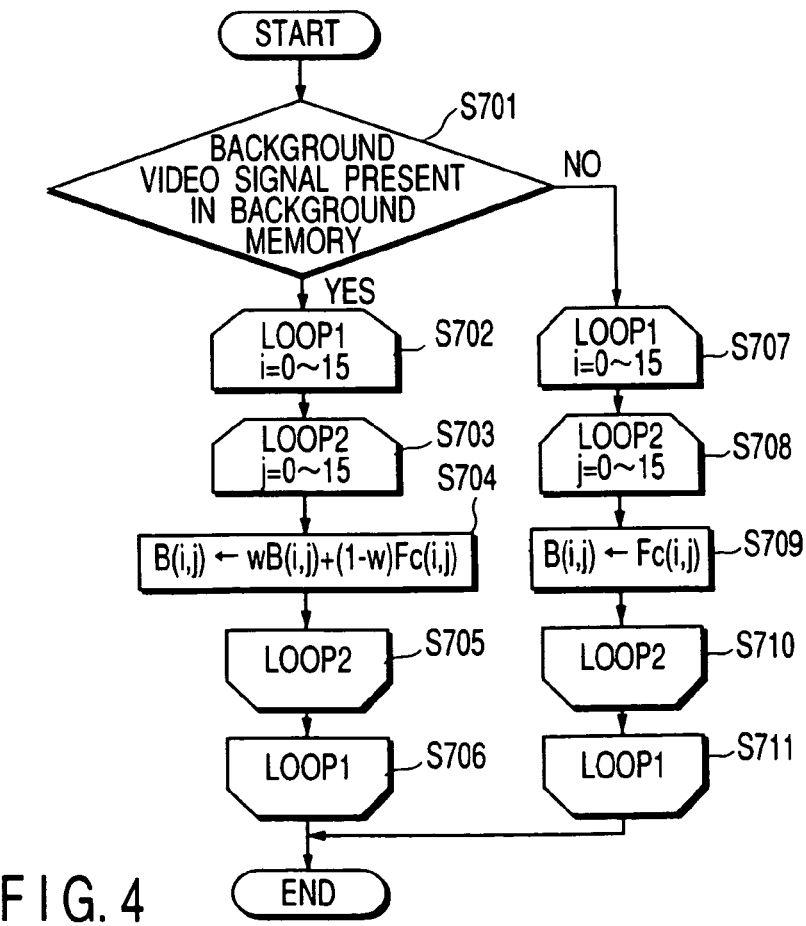
FIG. 4 is a flowchart schematically illustrating a process of updating the contents of a background memory in this embodiment.

The flowchart shown in FIG. 4 illustrates a process in the background memory update step S210 in FIG. 3. Referring to FIG. 4, $F_C(i, j)$ represents the luminance of each pixel of the reconstructed video signal of the interest macro-block and B(i, j) represents the luminance of each pixel of the background video signal in the background memory 205.

First, it is determined whether or not the background video signal of the macro-block at the same position as the interest macro-block has already been written in the background memory 205 (step S701). When this background video signal has already been written in the background memory 205, the luminance $F_C(i, j)$ of each pixel of the reconstructed video signal of the interest macro-block is weighted with a weighting factor w (a real number not less than 0 and equal or smaller than 1) and its weighted mean is added to B(i, j) in the background memory 205 (step S704) in the loop of steps S702 to S706.

When the background video signal of the macro-block at the same position as the interest macro-block has not been written in the background memory 205, on the other hand, the reconstructed video signal $F_C(i, j)$ of the interest macro-block is written in B(i, j) in the background memory 205 (step S709) in the loop of steps S707 to S711.

Moving Object Determining Process S102

Figure 5:
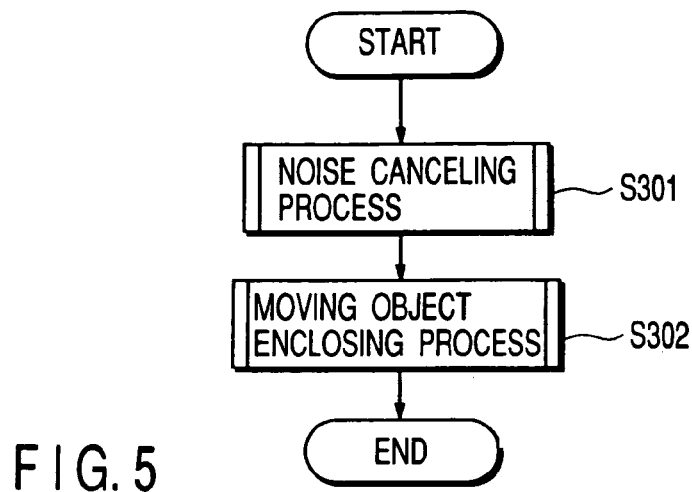
FIG. 5 is a flowchart schematically illustrating a process which is carried out by a moving object determining section in this embodiment.

Specific procedures of the moving object determining process S102 in FIG. 2 will be described below with reference to the flowchart illustrated in FIG. 5. The moving object determining section 203 determines a moving object from the result of macro-block-by-macro-block determination on a background macro-block/non-background macro-block from the first cross correlation calculator 202. As shown in FIG. 5, the moving object determining process includes a noise canceling process (step S301) and a moving object enclosing process (step S302).

In the noise canceling process S301, a non-background macro-block eight macro-blocks around which are all still is considered as noise and is removed in order to prevent the interest macro-block from being erroneously detected as a non-background macro-block due to fluctuation of a small object in the background video signal or noise generated at the time of picking up an object.

The moving object enclosing process S302 detects the smallest rectangle that encloses an area where non-background macro-blocks are present adjacent to one another (i.e., an area where a plurality of non-background macro-blocks are linked) or the smallest rectangle that encloses a moving object from the result of determination on a background macro-block/non-background macro-block after noise has been removed in the noise canceling process S301.

Noise Canceling Process S301

Figure 6:
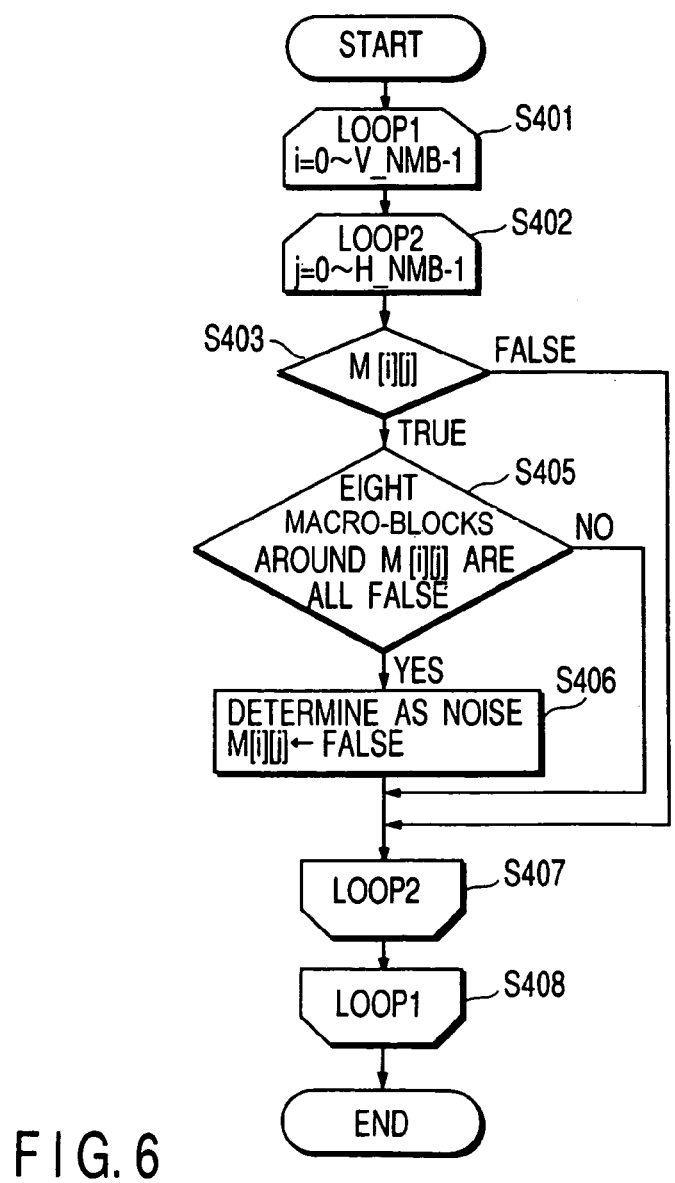
FIG. 6 is a flowchart schematically illustrating a noise canceling process which is performed in the moving object determining section in this embodiment.

The flowchart shown in FIG. 6 illustrates specific procedures of the noise canceling process S301 in FIG. 5. In FIG. 6, as in FIG. 3, "i" and "j" respectively represent the vertical and horizontal macro-block addresses, and V_NMB and H_NMB respectively represents the numbers of vertical and horizontal macro-blocks in a frame. The two-dimensional array M[i][j] stores information about whether each macro-block is a background macro-block or a non-background macro-block; TRUE indicates a non-background macro-block while FALSE indicates a background macro-block.

First, the two-dimensional array M[i][j] which is the result of the background determination for each macro-block is checked through steps S401 and S402 (step s403). When the value of the two-dimensional array M[i][j] is FALSE or the interest macro-block is a background macro-block, nothing will be done for that macro-block and the process goes to the next macro-block.

When the value of the two-dimensional array M[i][j] is TRUE or the interest macro-block is a non-background macro-block, the results of the background determination for eight macro-blocks around that macro-block are checked (step S405). If all the eight macro-blocks have resulted in FALSE or they are background macro-blocks, that interest macro-block is determined as noise and is rewritten to a background macro-block (step S406). If any of the eight macro-blocks has resulted in TRUE, the interest macro-block is not determined as noise and the process goes to the next macro-block. Note that macro-blocks outside the screen are assumed as background macro-blocks.

Moving Object Enclosing Process S302

FIGS. 7 through 11 present flowcharts which illustrate specific procedures-of the moving object enclosing process S302 in FIG. 5. In the flowcharts, n is a counter value indicating the number of moving objects. S1 to S4 are parameters that indicate the range for searching for a rectangle which encloses a moving object. S1 and S2 are the initial point and end point of the vertical address and S3 and S4 are the initial point and end point of the horizontal address.

Figure 7:
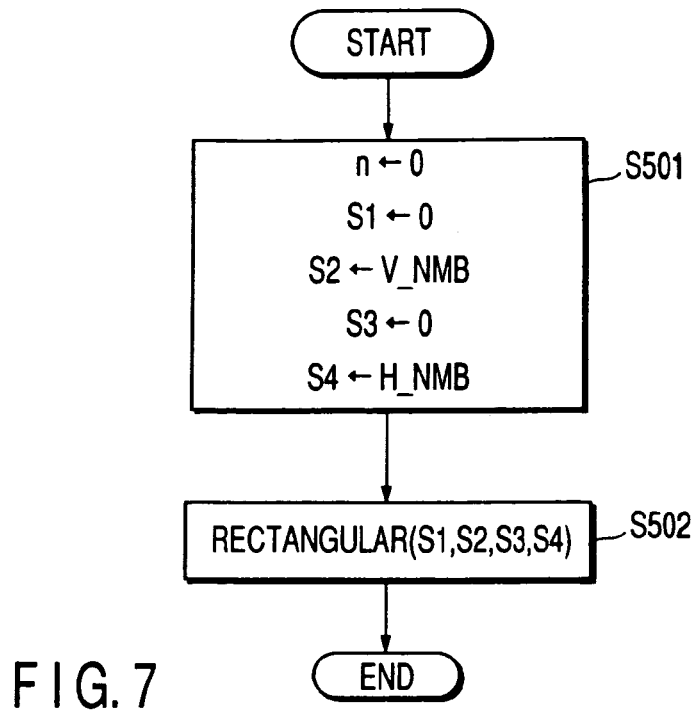
FIG. 7 is a flowchart schematically illustrating a moving object enclosing process which is performed in the moving object determining section in this embodiment.
Figure 8:
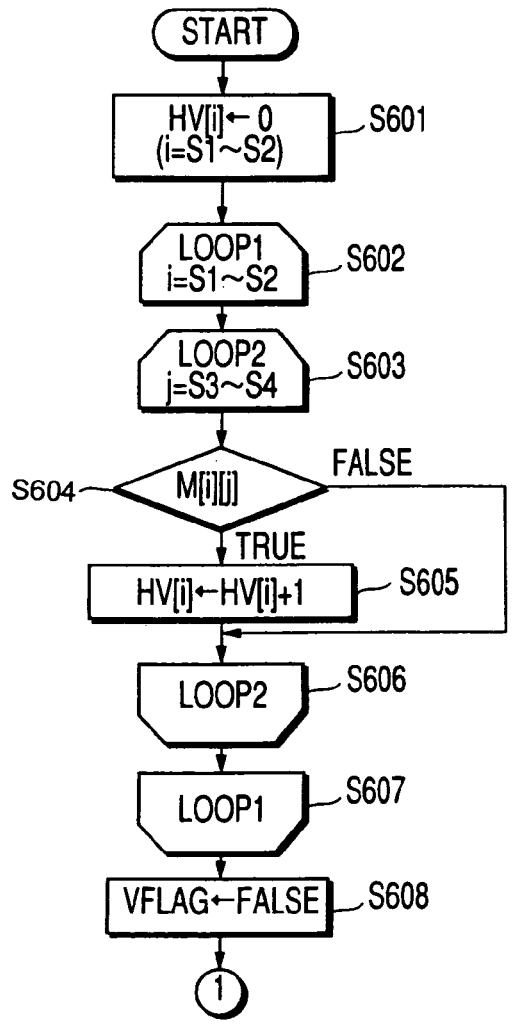
FIG. 8 is a flowchart schematically illustrating the moving object enclosing process which is performed in the moving object determining section in this embodiment.
Figure 11:
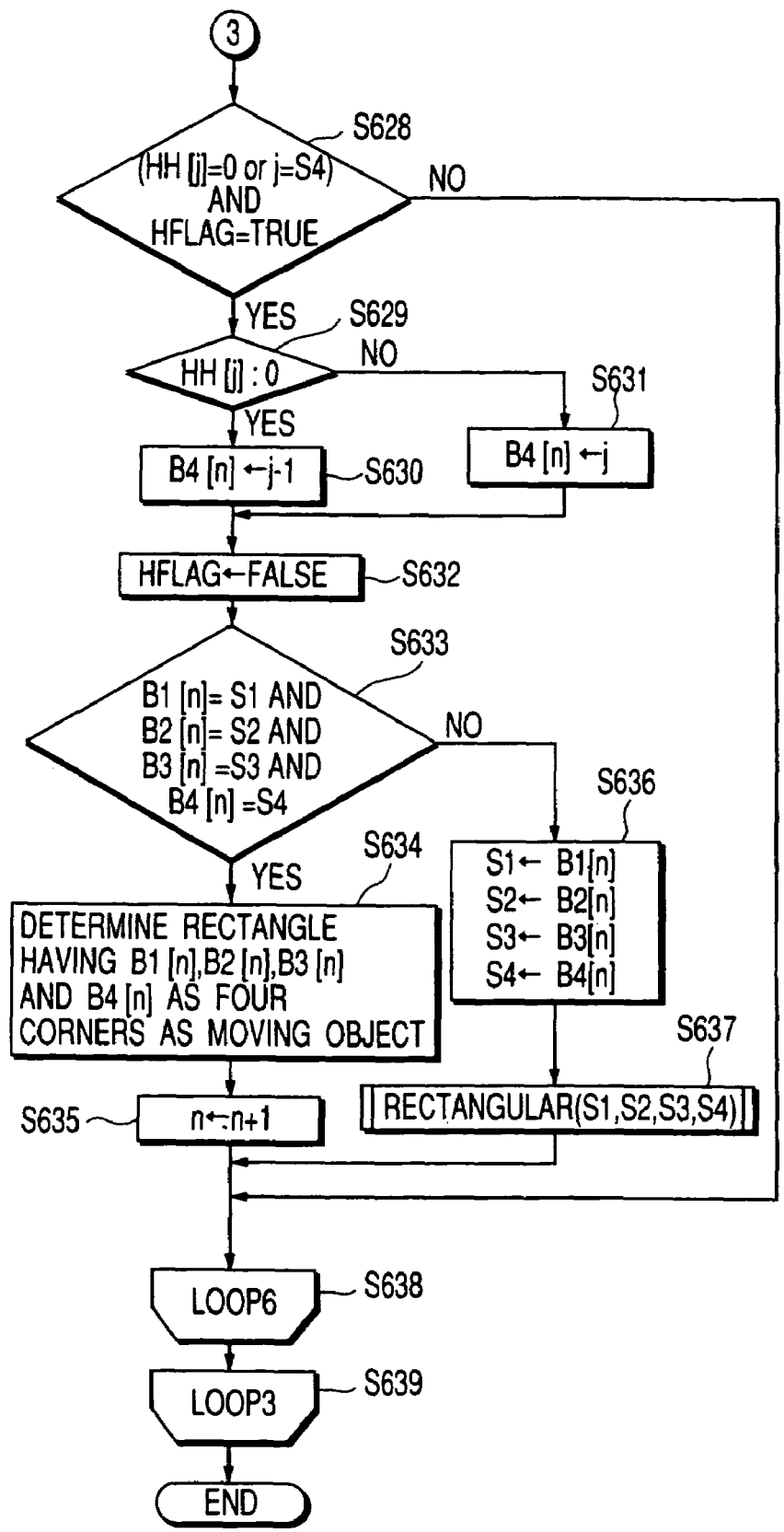
FIG. 11 is a flowchart schematically showing the moving object enclosing process which is performed in the moving object determining section in this embodiment.

As shown in FIG. 7, first, initialization is performed (step S501) to designate the entire frame as a search range. Next, a function Rectangular is called to search for the smallest rectangle that encloses a moving object in the designated search range (step S502).

FIGS. 8 to 11 illustrate the process contents of the function Rectangular. The function Rectangular takes, as inputs, the search ranges S1-S4, the number of moving objects n and the two-dimensional array M[i][j] where the results of the background. determination for the individual macro-blocks are stored, and has, as outputs, one-dimensional arrays B1-B4 where the addresses of a rectangle as the search results are stored and the number of moving objects n.

A one-dimensional array HV is a work array for generating a histogram for the number of non-background macro-blocks in the vertical direction, and a one-dimensional array HH is a work array for generating a histogram for the number of non-background macro-blocks in the horizontal direction. A variable VFLAG is a flag which is set to TRUE when the value of the horizontal histogram is not 0 and to FALSE when this value is 0. A variable HFLAG is a flag which is set to TRUE when the value of the vertical histogram is not 0 and to FALSE when this value is 0.

First, the ranges of S1 and S2 as the search ranges of the work array HV for generating a histogram for the number of non-background macro-blocks in the vertical direction are initialized to 0 (step S601). In the double loops of LOOP1 and LOOP2 (S602 to S607), the histogram HV[i] for the number of non-background macro-blocks in the vertical direction in the search range is generated. Specifically, the value of the result of the background determination, M[i][j], for each macro-block is checked (step S604) and if the value is TRUE or the macro-block is a non-background macro-block, HV[i] is incremented by 1 (step S605), whereas if the value is FALSE, nothing will be done.

Next, the vertical histogram HV[i] generated in the above-described manner is searched for a non-zero continuous portion. First, the flag VFLAG is set to FALSE (step S608).

Then, it is checked if the histogram HV[i] is not 0 and the flag VFLAG is FALSE in the order of the search range S1 to the search range S2 (step S610). The portion that satisfies this condition is the portion of the initial point of a non-zero continuous portion in the histogram HV[i]. Therefore, this portion becomes a candidate for the vertical initial point of the rectangle to be searched, so that an address i is stored in the one-dimensional array B1[n] and the flag VFLAG is set to TRUE (step S611).

Next, it is checked if the histogram HV[i] is 0 or the end point of the search range and the flag VFLAG is TRUE (step S612). The portion that satisfies this condition is the portion of the end point of a non-zero continuous portion in the histogram HV[i]. Therefore, this portion becomes a candidate for the vertical end point of the rectangle to be searched, so that if the histogram HV[i] is 0, an address i−1 is stored in the one-dimensional array B2[n] (step S614), and the address i is stored in the one-dimensional array B2[n] otherwise (step S615). Then, the flag VFLAG is set again to FALSE (step S611).

Next, the search ranges S3 and S4 for the work array HH for generating a histogram HH[i] for the number of non-background macro-blocks in the horizontal direction are initialized to 0 (step S617). In the next double loops of LOOP4 and LOOP5 (S618 to S623), the histogram HH[i] for the number of non-background macro-blocks in the horizontal direction in the search range is generated. Specifically, the value of the result of the background determination, M[i][j], for each macro-block is checked (step S604) and if the value is TRUE or the macro-block is a non-background macro-block, HH[i] is incremented by 1 (step S605), whereas if the value is FALSE, nothing will be done.

Next, the generated horizontal histogram HH[i] is searched for a non-zero continuous portion. First, the flag HFLAG is set to FALSE (step S624).

Then, it is checked if the histogram HH[i] is not 0 and the flag HFLAG is FALSE in the order of the search range S3 to the search range S4 (step S626). The portion that satisfies this condition is the portion of the initial point of a non-zero continuous portion in the histogram HH[i]. Therefore, this portion becomes a candidate for the horizontal initial point of the rectangle to be searched, so that an address j is stored in the one-dimensional array B3[n] and the flag HFLAG is set to TRUE (step S627).

Next, it is checked if the histogram HH[i] is 0 or the end point of the search range and the flag HFLAG is TRUE (step S628). The portion that satisfies this condition is the portion of the end point of a non-zero continuous portion in the histogram HH[i]. Therefore, this portion becomes a candidate for the horizontal end point of the rectangle-to be searched, so that if the histogram HH[i] is 0, an address j−1 is stored in the one-dimensional array B4[n] (step S630), and the address j is stored in the one-dimensional array B4[n] otherwise (step S631). Then, the flag HFLAG is set again to FALSE (step S632).

As the search based on the vertical histogram HV[i] and the horizontal histogram HH[i] is completed, it is then checked if the search results B1[n] to B4[n] coincide with the search ranges S1 to S4 (step S633). If there is a match, no further search is necessary and it is determined that the smallest rectangle has been acquired (step S634). Then, n representing the number of moving objects is incremented by 1 (step S635) and the process goes to a search for the next moving object.

If the search results B1[n] to B4[n] do not coincide with the search ranges S1 to S4, a plurality of moving objects are still present in the range of the search results, so that the search results B1[n] to B4[n] are set to the search ranges S1 to S4 (step S636) and the function Rectangular is called again (step S637).

Figure 12:
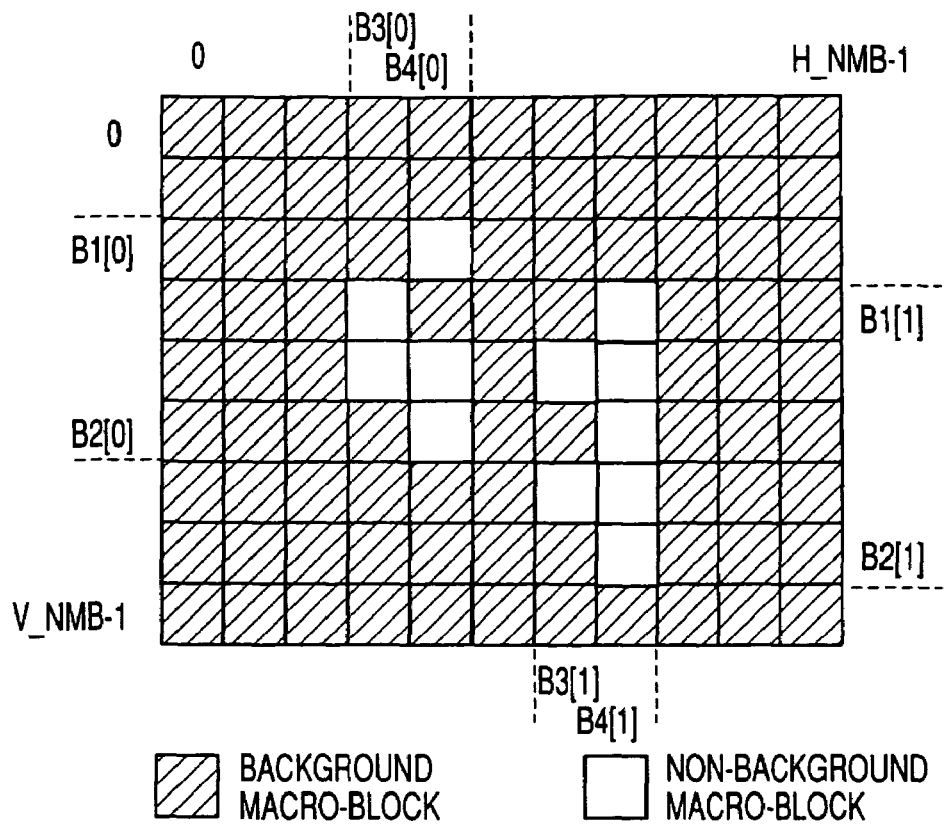
FIG. 12 is a diagram exemplifying the result of decision made by the moving object determining section in this embodiment.

FIG. 12 exemplifies the result of decision made by the moving object determining section 203 in the above-described procedures. In this example, two moving objects are determined. The determination results show that the origin of the addresses of the macro-blocks is on the upper left of the frame and moving objects are determined in the layout of B1[0] to B4[0] and B1[1] to B4[1] as shown in FIG. 12.

Moving Object Combination Display Process S103

Figure 2:
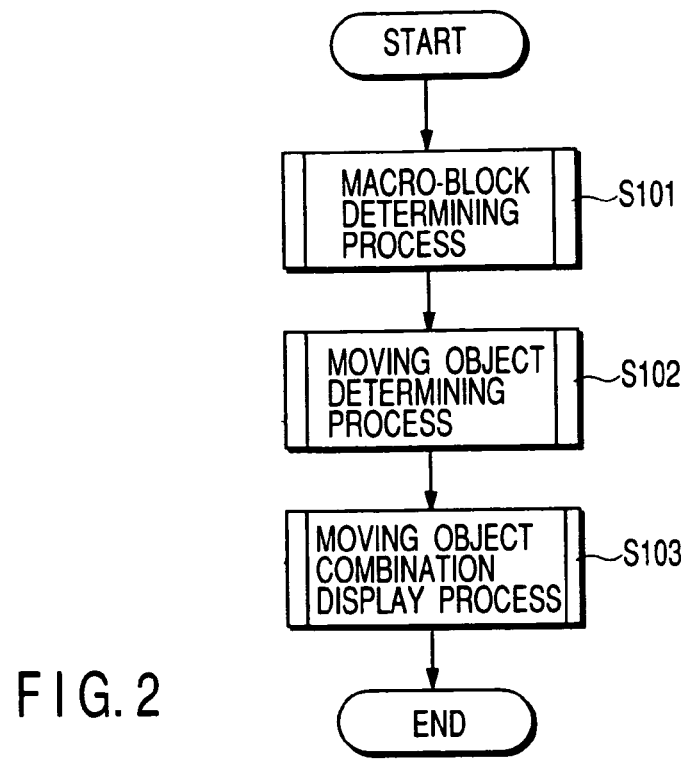
FIG. 2 is a flowchart schematically illustrating a process which is carried out by a moving object detector section in this embodiment.
Figure 3:
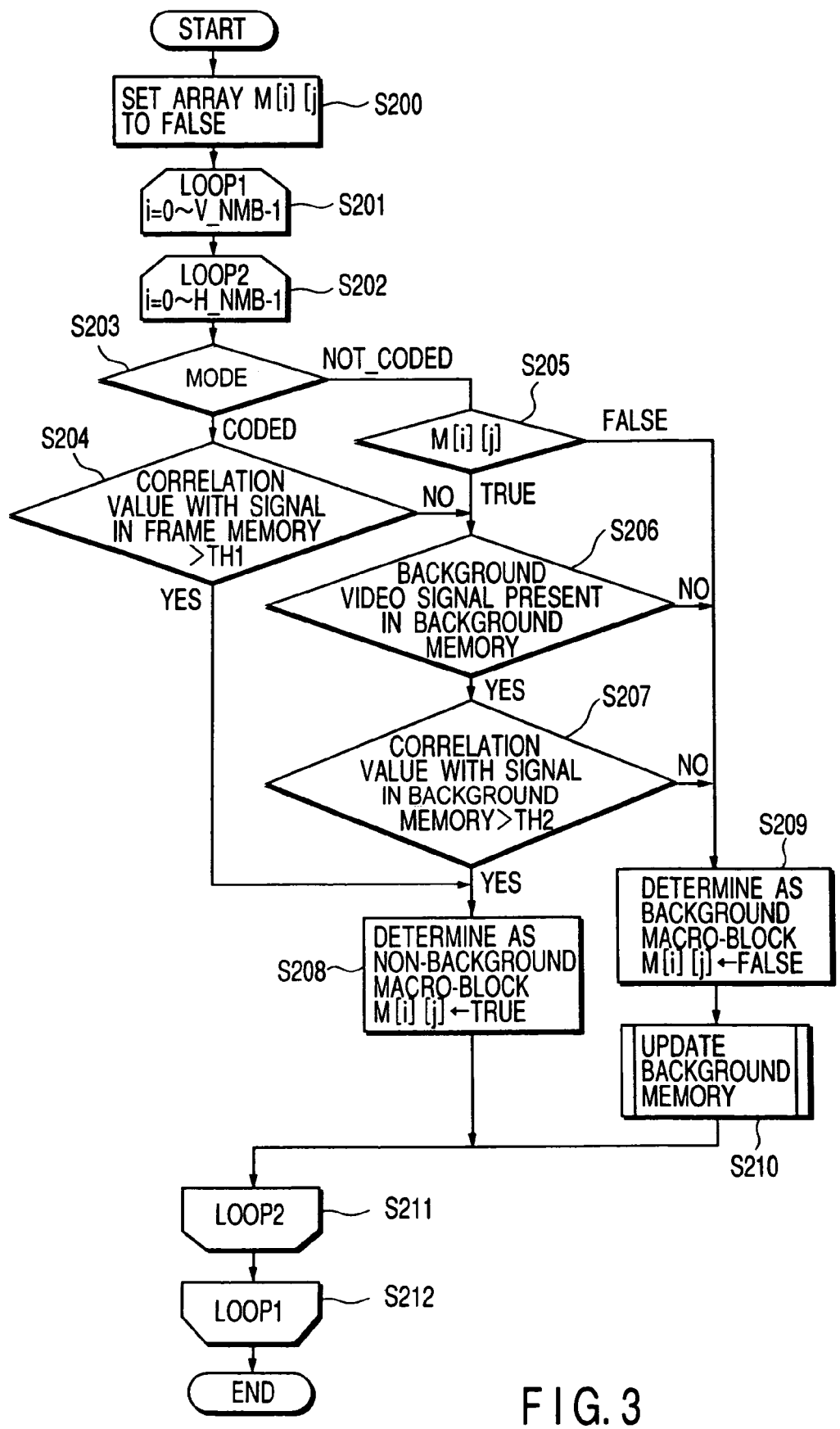
FIG. 3 is a flowchart schematically illustrating a process which is performed by a macro-block determining section in this embodiment.
Figure 13:
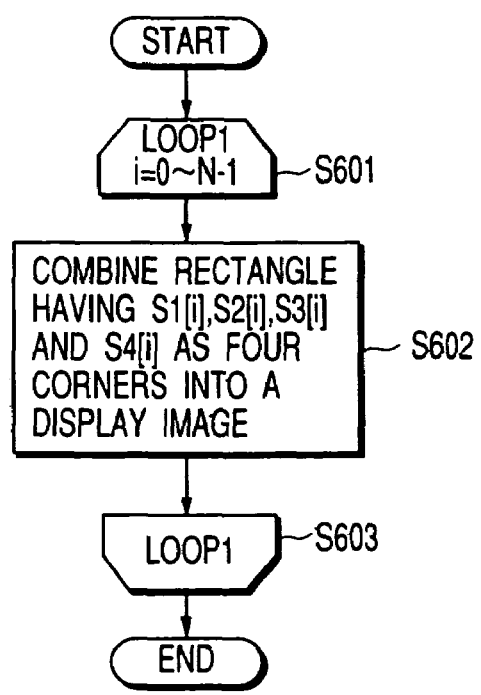
FIG. 13 is a flowchart schematically illustrating a process which is performed by a moving object combination display in this embodiment.

FIG. 13 illustrates specific procedures of the moving object combination display process S103 in FIG. 2. The second cross correlation calculator 204 generates a video image which is obtained by combining information indicating the area of an moving object determined by the moving object determining section 203 and the reconstructed video signal. In this diagram, n indicates the number of moving objects in the frame that is acquired by the moving object determining section 203. As B1[i] to B4[i] represent macro-blocks at the four corners of each moving object, a rectangle enclosing the moving object is drawn with a white line and is combined with a reconstructed video image (step S602).

Figure 14:
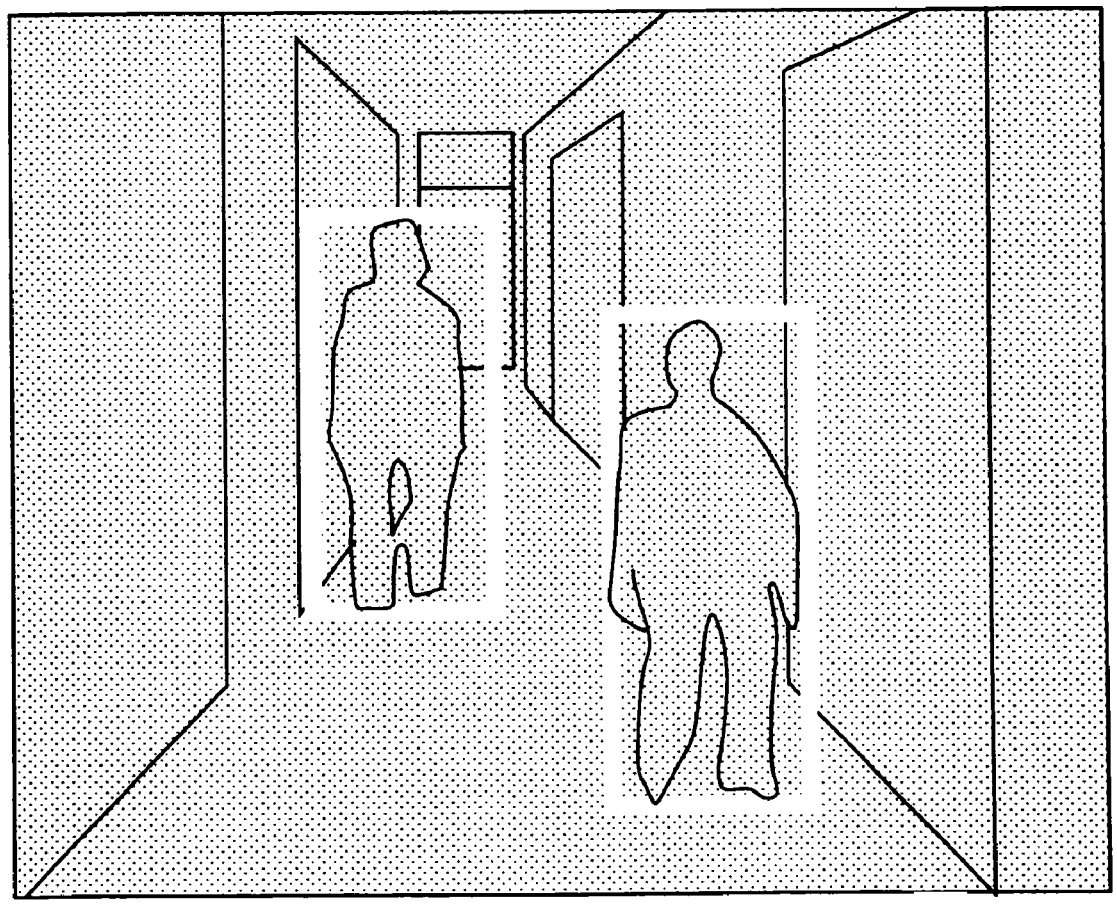
FIG. 14 is a diagram exemplifying the result of the display made by the moving object combination display in this embodiment.

FIG. 14 exemplifies the video image that is produced and displayed by the moving object combination display 204 in that manner. White lines are so displayed as to enclose two moving objects (persons in this example) present in the reconstructed video.

Although a line enclosing the area of an moving object is displayed on the display screen for the reconstructed video signal in this example as information that indicates the area of the moving object, the entire area of a moving object may be displayed in a different color and different luminance from those of the other area to distinguish the moving object. Any display method may be taken as long as the area of a moving object is distinguishable from the other area. This invention can be modified in other forms.

As apparent from the foregoing description, this invention can detect a moving object in motion video fast, reliably and accurately.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video moving object detecting apparatus comprising:
  a video decoder which decodes encoded data obtained by compression-encoding a motion video signal:
  a determination unit configured to determine whether a video signal corresponding to a unit area represents a background area or a non-background area, the video signal being part of a reconstructed video signal acquired by the video decoder;

a detection unit configured to detect an area of a moving object from a result of the determination done by the determination unit for each unit area;

a display which displays information indicating the area of the moving object, determined by the determination unit, on a display screen for the reconstructed video signal;

a first cross correlation calculator which computes a cross correlation value between a current frame of the reconstructed video signal and a video signal preceding by one frame every unit area;

a storage section which stores a background video signal corresponding to a background component of the reconstructed video;

a second cross correlation calculator which computes a second cross correlation value between the current frame of the reconstructed video signal and the background video signal stored in the storage section every unit area wherein the determination unit is configured to determine whether the video signal in the unit area is a background area or a non-background area on the basis of encoding mode information obtained from the video decoder, the first cross correlation value and the second cross correlation value; and an update unit configured to, when the determination unit determines that the video signal in the predetermined unit area of the reconstructed video signal represents a background area, update the background video signal stored in the storage with the video signal in the unit area which has been determined as representing the background area.

* * * * *